(12) United States Patent
Mahajan et al.

(10) Patent No.: US 11,199,988 B2
(45) Date of Patent: Dec. 14, 2021

(54) DATA MIGRATION ACROSS TIERS IN A MULTI-TIERED STORAGE AREA NETWORK

(71) Applicant: International Business Machines Corporation, Armonk, NY (US)

(72) Inventors: Pravin Kailas Mahajan, Pune (IN); Abhishek Jain, Baraut (IN); Sasikanth Eda, Vijayawada (IN); Vikrant Malushte, Pune (IN)

(73) Assignee: International Business Machines Corporation, Armonk, NY (US)

( * ) Notice: Subject to any disclaimer, the term of this patent is extended or adjusted under 35 U.S.C. 154(b) by 274 days.

(21) Appl. No.: 16/404,926

(22) Filed: May 7, 2019

(65) Prior Publication Data

US 2020/0356300 A1    Nov. 12, 2020

(51) Int. Cl.
*G06F 3/06* (2006.01)
*G06F 12/0893* (2016.01)

(52) U.S. Cl.
CPC .......... *G06F 3/0649* (2013.01); *G06F 3/0611* (2013.01); *G06F 3/0644* (2013.01); *G06F 3/0685* (2013.01); *G06F 12/0893* (2013.01); *G06F 2212/1024* (2013.01); *G06F 2212/608* (2013.01)

(58) Field of Classification Search
CPC ...... G06F 3/0649; G06F 3/0611; G06F 3/064; G06F 3/0685; G06F 12/0893; G06F 2212/1024; G06F 2212/608
See application file for complete search history.

(56) References Cited

U.S. PATENT DOCUMENTS

| | | | |
|---|---|---|---|
| 10,019,362 B1 * | 7/2018 | Chatterjee | G06F 3/065 |
| 10,168,946 B2 | 1/2019 | Karve et al. | |
| 2009/0132770 A1 * | 5/2009 | Lin | G06F 12/0886 711/154 |
| 2012/0059994 A1 * | 3/2012 | Montgomery | G06F 3/0685 711/119 |
| 2016/0011984 A1 * | 1/2016 | Speer | G06F 3/067 711/102 |
| 2017/0097886 A1 | 4/2017 | Banerjee et al. | |
| 2018/0121351 A1 | 5/2018 | Zhang et al. | |
| 2018/0196755 A1 | 7/2018 | Kusuno et al. | |
| 2019/0012082 A1 | 1/2019 | Mitkar et al. | |

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — Charles Rones
*Assistant Examiner* — Han V Doan
(74) *Attorney, Agent, or Firm* — Stosch Sabo

(57) ABSTRACT

A storage volume functioning at least in part as cache for a tiered storage system, the storage volume having an in-memory write extent consisting of write-accessed grains retrieved from a plurality of hot extents in a first tier of the tiered storage system, where the in-memory write extent is a same size as a block erase size of a solid-state drive tier of the tiered storage system. The storage volume further having an in-memory read extent consisting of read-accessed grains retrieved from the plurality of hot extents in the first tier of the tiered storage system.

16 Claims, 11 Drawing Sheets

DATA MIGRATION ACROSS TIERS IN A MULTI-TIERED STORAGE AREA NETWORK

BACKGROUND

The present disclosure relates to data storage, and, more specifically, to data migration in a tiered storage system.

Storage controllers can manage tiered storage systems having different types of storage volumes with different performance characteristics in different tiers. Frequently accessed data can be stored in a storage tier having higher performance storage volumes (e.g., solid-state drives) and infrequently accessed data can be stored in a storage tier having lower performance storage volumes (e.g., tape drives). Separating data according to a storage tiering policy can result in adequate performance and reduced cost.

SUMMARY

Aspects of the present disclosure are directed toward a computer-implemented method for migrating data in a tiered storage system comprising a hard disk drive tier and a solid-state drive tier, the method comprising characterizing grains in a first extent and a second extent in the hard disk drive tier by identifying a first grain in the first extent and a second grain in the second extent with write accesses and identifying a third grain in the first extent and a fourth grain in the second extent with read accesses, where the first extent and the second extent are hot extents. The method further comprises migrating the first grain and the second grain from the first extent and the second extent to an in-memory write extent stored in an in-memory cache of the tiered storage system. The method further comprises migrating the third grain and the fourth grain from the first extent and the second extent to an in-memory read extent stored in the in-memory cache of the tiered storage system.

Additional aspects of the present disclosure are directed to systems and computer program products configured to perform the method described above.

Further aspects of the present disclosure are directed toward a tiered storage system including a first tier comprising a plurality of hot extents, where a respective hot extent comprises write-accessed grains, read-accessed grains, and un-accessed grains. The tiered storage system further including a cache, the cache comprising a write extent consisting of write-accessed grains from a plurality of hot extents in the first tier and a read extent consisting of read-accessed grains from the plurality of hot extents in the first tier. The tiered storage system further including a second tier comprising solid-state drives, a respective solid-state drive comprising an extent consisting of write-accessed grains from the write extent.

Further aspects of the present disclosure are directed toward a storage volume functioning at least in part as cache for a tiered storage system, the storage volume comprising an in-memory write extent consisting of write-accessed grains retrieved from a plurality of hot extents in a first tier of the tiered storage system, where the in-memory write extent is a same size as a block erase size of a solid-state drive tier of the tiered storage system. The storage volume further comprising an in-memory read extent consisting of read-accessed grains retrieved from the plurality of hot extents in the first tier of the tiered storage system.

The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
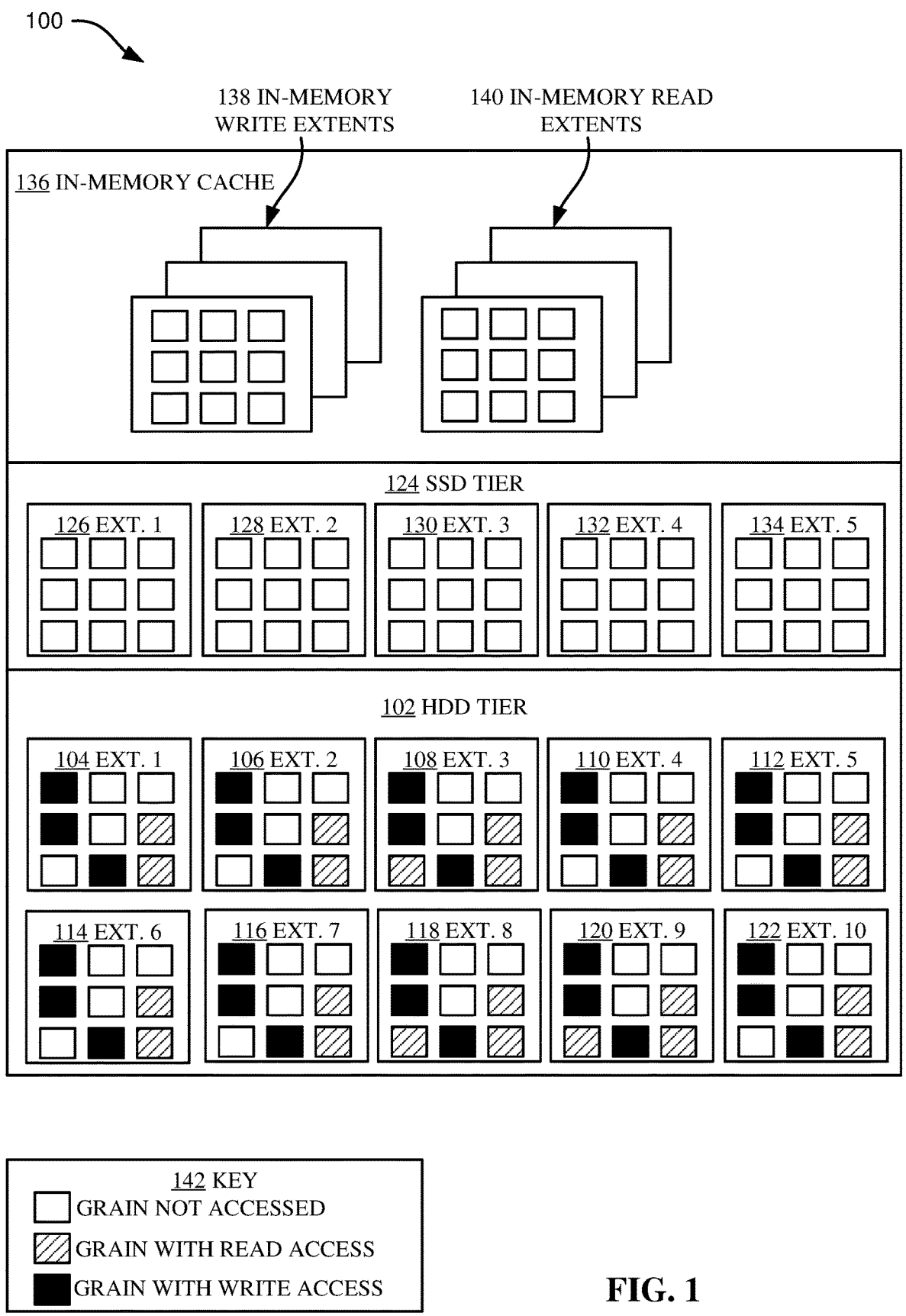
FIG. 1 illustrates a diagram of a tiered storage system with hot extents, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward data storage, and, more specifically, to data migration in a tiered storage system (e.g., a storage area network (SAN)). While not limited to such applications, embodiments of the present disclosure may be better understood in light of the aforementioned context.

Aspects of the present disclosure track in-memory data structures for read and write grains, where these grains are written in-memory based on the access pattern such as read-only (e.g., read-accessed) grains being written to an in-memory read extent and read-write (e.g., write-accessed) grains being written to an in-memory write extent. Further aspects of the present disclosure are configured to dynamically align the grain/extent size of the in-memory write extent and the in-memory read extent to a solid-state drive (SSD) block erase size based on different SSD types in a hybrid SSD environment. Further aspects of the present disclosure are directed to a tiering mechanism to tier the data back to a hard disk drive (HDD) tier by forming the original HDD extent or grain on the original location in the extent using the in-memory data structure for grains of the extent.

Storage volumes can be split into many logical units such as extents. Extents are divided into smaller units such as grains (also referred to as granules, chunks, sub-extents, etc.). Extents can be classified as hot extents or cold extents, where hot extents receive more input/output (I/O) operations relative to cold extents. In other words, hot extents are accessed, used, and/or modified more often compared to cold extents. Storage controllers can move hot extents to higher performance tiers (e.g., promotion) and colder extents to lower-performance tiers (e.g., demotion) as part of a storage tiering policy.

In tiered storage systems having, for example, solid state drives (SSDs) in a first tier, hard disk drives (HDDs) in a second tier, and/or tape drives in a third tier, data can be strategically distributed throughout the tiers in order to realize an economical system with appropriate performance. For example, hot extents are typically stored in SSDs because SSDs exhibit improved performance for data that is accessed frequently relative to other types of storage volumes. In contrast, cold extents are typically stored in tape drives because tape drives are a less expensive method of storing data that is accessed infrequently. Furthermore, extents can be migrated between tiers as different extents transition from hot extents to cold extents, or vice versa, as a result of changing usage of the data in the storage system.

Despite the performance improvements associated with SSDs such as lower latency relative to HDDs, SSDs nonetheless have disadvantages. A first disadvantage is that SSDs do not overwrite data, but rather first erase the data block and then rewrite data to the erased data block. A second disadvantage is that SSDs are associated with a finite number of program erase cycles (referred to as write endurance). As a result, a data block can only be erased and re-written a certain number of times before it is worn out and the associated SSD storage volume must be replaced.

SSDs are typically divided into a number of blocks, where each block is further divided into a number of pages. In SSDs, the unit of writing is a page, whereas the unit of erasing is a block. This results in a technical challenge: if the SSD needs to erase a single page of data (e.g., as a result of a garbage collection operation), the SSD must erase the entire block associated with the single page of data, thereby erasing multiple pages of data that do not necessarily need to be erased. Garbage collection is performed by first identifying a data block having a number of invalid pages above a customizable threshold, then moving the valid pages of that data block to another data block, then erasing the identified data block, and finally by moving the valid pages from the other data block back to the identified and erased data block. Garbage collection and wear leveling (e.g., the even distribution of data within or between SSD volumes) can collectively result in writing valid data multiple times on an SSD, thereby reducing its working life. This excessive writing to SSDs is referred to as write amplification.

Some aspects of the present disclosure include techniques for reducing write amplification and improving SSD lifespans in tiered storage systems. Aspects of the present disclosure can improve SSD lifespans by classifying grains in a plurality of hot extents as write-accessed grains, read-accessed grains, or un-accessed grains. Aspects of the present disclosure can then transfer the write-accessed grains from multiple hot extents to an in-memory write extent and can transfer the read-accessed grains from multiple hot extents to an in-memory read extent. The size of the in-memory read extent and the in-memory write extent can be configured in such a way that it matches the size of the SSD erase block size in the tiered storage system where the data can be stored according to hotness. The un-accessed grains are not transferred. Once the in-memory write extent is filled above a threshold with write-accessed grains, the data can be transferred to an extent of the SSD tier of the tiered storage system. Once the in-memory read extent is filled above a threshold with read-accessed grains, the data can be transferred to a cache of the tiered storage system. Thus, aspects of the present disclosure can reduce write amplification by selectively migrating write-accessed grains to the SSD tier via an in-memory write extent in order to improve the erase cycle and reduce write amplification. As another example, aspects of the present disclosure can preserve SSD storage space by holding read-accessed grains in cache. The aforementioned advantages (and any advantages discussed hereafter) are example advantages, and embodiments of the present disclosure can exist with that realize all, some, or none of the aforementioned advantages while remaining within the spirit and scope of the present disclosure.

FIG. 1 illustrates a first instance 100 of a tiered storage system having an HDD tier 102, an SSD tier 124, and an in-memory cache 136. As seen in FIG. 1, the HDD tier 102 includes numerous extents such as extent 1 104 through extent 10 122. Likewise, SSD tier 124 includes numerous extents such as extent 1 126 through extent 5 134. Each of the extents is associated with multiple grains. Although nine grains are shown in each of extents 1 104 through extent 10 122 and extent 1 126 through extent 5 134, this is purely for illustration and more or fewer grains can be present in more or fewer extents than illustrated in HDD tier 102 and SSD tier 124. Furthermore, individual drives/disks are not shown in either HDD tier 102 or SSD tier 124 for clarity, but in reality, the extents illustrated in each of HDD tier 102 and SSD tier 124 exist within one or more storage volumes (e.g., disks, drives, etc.).

As shown in key 142, each grain can be classified as not accessed (white), read-accessed (cross-hatched), or write-accessed (black). The classifications of respective grains in each extent can be determined based on permissions or access rights associated with previous or current uses of the data in respective grains. While write-accessed, read-accessed, and un-accessed are discussed above, other variations are also possible, such as, but not limited to, no permissions, read-permissioned, write-permissioned, and/or execute-permissioned.

In addition to grains being classified as write-accessed, read-accessed, or un-accessed, extents 1 104 through extent 10 122 in HDD tier 102 can also be classified as hot extents or cold extents. In various embodiments, classifications of hot extents and cold extents can use or not use the grain classifications discussed above. As one example using the aforementioned grain classifications, if an extent has a proportion of grains classified as write-accessed and/or read-accessed, the extent can be classified as a hot extent, otherwise it can be classified as a cold extent. As an example of not using the aforementioned grain classifications, if an extent has a number of input/output (I/O) operations above a threshold, regardless of the type of I/O operations or the distribution of I/O operations between grains in the extent, the extent can be classified as a hot extent, otherwise it can be classified as a cold extent. As will be appreciated by one skilled in the art, many variations on the above-mentioned techniques, in addition to other techniques, strategies, and methodologies known in the art, can be utilized in classifying extents as hot extents or cold extents.

For purposes of explanation alone and without any suggested limitation, assume extent 3 108, extent 8 118, and extent 9 120 are classified as hot extents.

Figure 7:
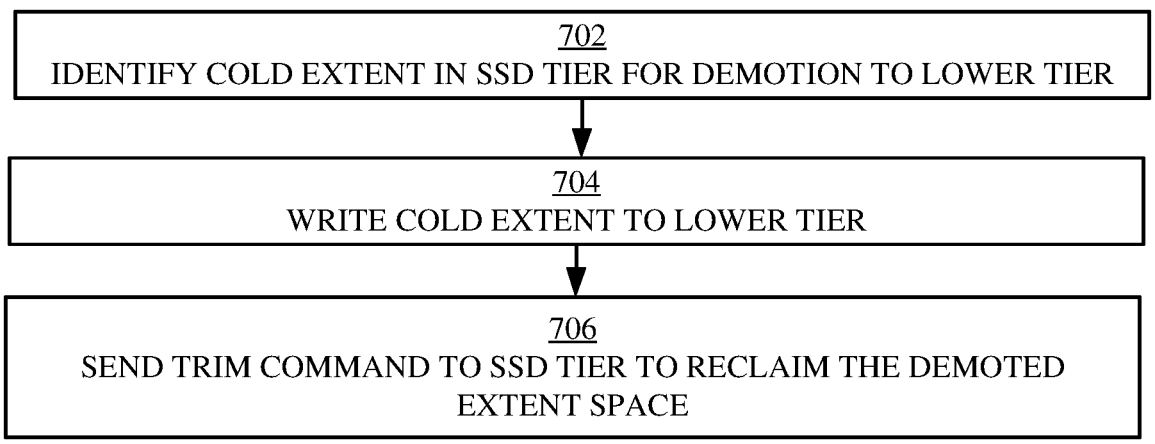
FIG. 7 illustrates a flowchart of an example method for demoting cold extents, in accordance with embodiments of the present disclosure.
Figure 8:
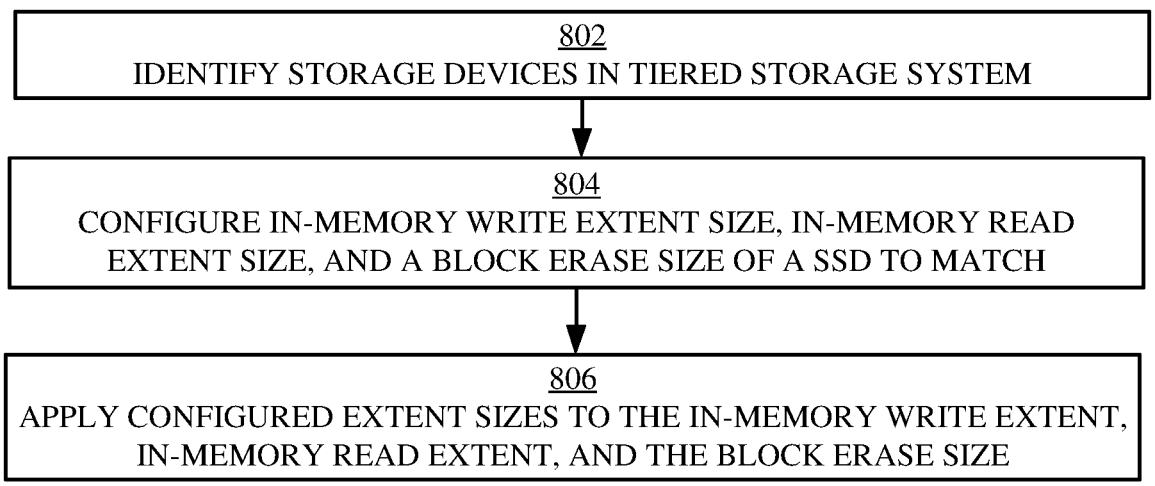
FIG. 8 illustrates a flowchart of an example method for configuring extent sizes and block erase sizes in a tiered storage system, in accordance with embodiments of the present disclosure.

Some aspects of the present disclosure generally relate to one or more of the following non-limiting examples:

(1) migrating write-accessed grains in hot extents of HDD tier 102 to an in-memory write extent 138 and migrating read-accessed grains in hot extents of HDD tier 102 to an in-memory read extent 140 (discussed hereinafter with respect to FIGS. 2 and 5); and/or (2) migrating write-accessed grains from an in-memory write extent 138 to the SSD tier 124 (discussed hereinafter with respect to FIGS. 3 and 5); and/or (3) storing read-accessed grains from filled in-memory read extent 140 to in-memory cache 136 (discussed hereinafter with respect to FIGS. 3 and 5); and/or (4) storing a modified write-accessed grain from SSD tier 124 in the in-memory write extent 138 (discussed hereinafter with respect to FIGS. 4 and 6); and/or (5) demoting cold extents from the SSD tier 124 to a lower tier (discussed hereinafter with respect to FIG. 7); and/or (6) configuring extent sizes and/or block erase sizes of storage devices in the tiered storage system (discussed hereinafter with respect to FIG. 8).

While FIG. 1 illustrates all grains in HDD tier 102 classified as un-accessed, read-accessed, or write-accessed, embodiments also exist where only grains in hot extents of HDD tier 102 are classified as un-accessed, read-accessed, or write-accessed. Such embodiments may be beneficial where hot extents and cold extents are classified according to a classification scheme that does not utilize the grain classifications discussed above. In such embodiments, memory and/or processing power can be reduced by only classifying grains within hot extents rather than grains in all extents.

Each of HDD tier 102, SSD tier 124, and in-memory cache 136 are communicatively coupled to one another. In some embodiments, a storage controller (not shown) is communicatively coupled to each of HDD tier 102, SSD tier 124, and in-memory cache 136, and the storage controller is configured to classify extents as hot extents or cold extents, classify grains within at least the hot extents, manage migrations of write-accessed grains from hot extents in HDD tier 102 to SSD tier 124 via in-memory write extents 138, manage migrations of read-accessed grains from hot extents in HDD tier 102 to in-memory cache 136 via in-memory read extent 140, and/or implement other variations of the present disclosure discussed hereafter.

In-memory cache 136 can be a working memory associated with the tiered storage system. In various embodiments, in-memory cache 136 can reside within, or be designated by, a storage controller (not shown). In some embodiments, in-memory cache 136 can be a relatively high-performance memory (e.g., SSD, flash, etc.). In some embodiments, in-memory cache 136 is a designated storage volume, a portion of a storage volume, or a collection of multiple storage volumes. In some embodiments, in-memory cache 136 is a designated portion of SSD tier 124.

Figure 2:
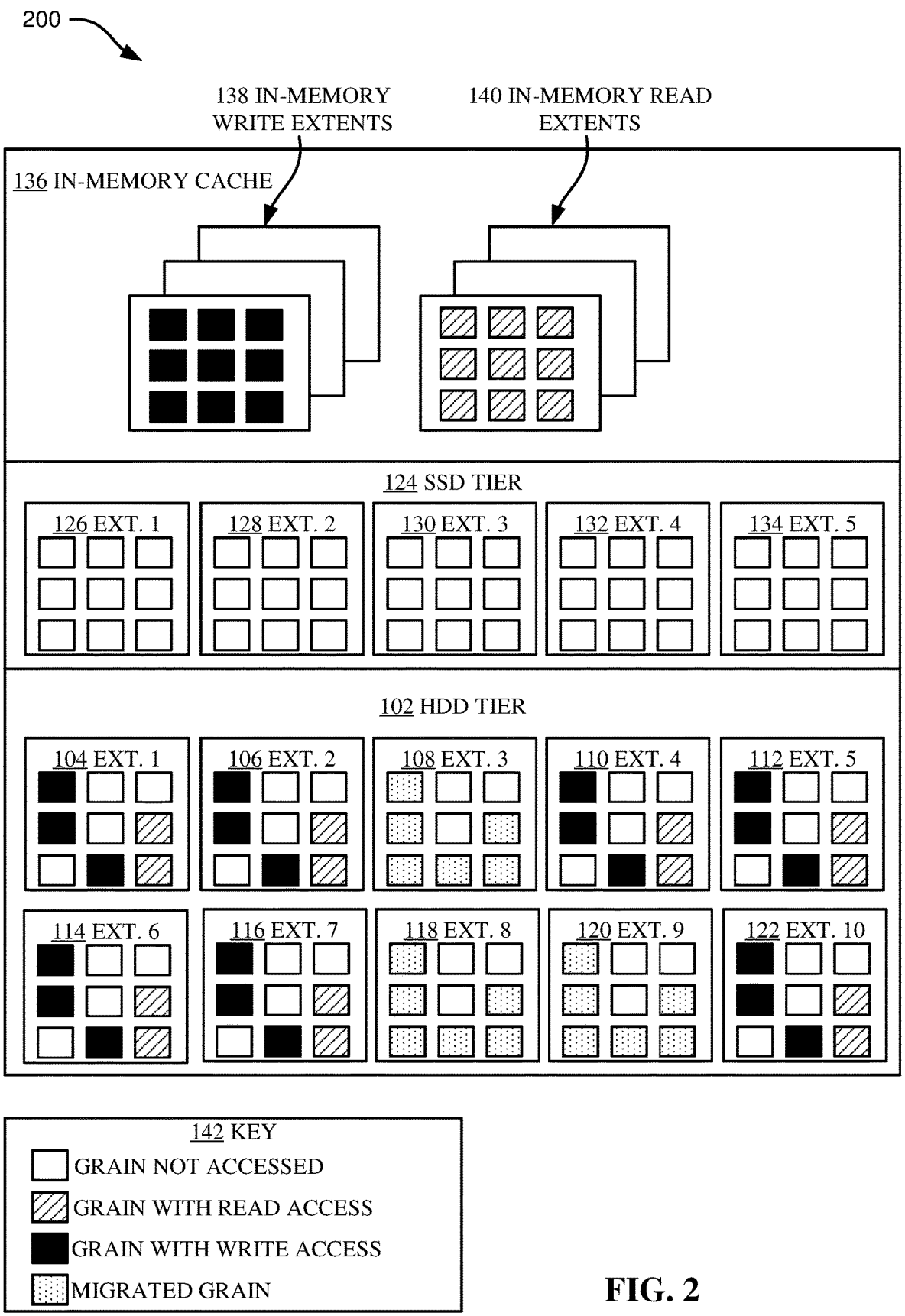
FIG. 2 illustrates a diagram of a tiered storage system with write-accessed grains of hot extents migrated to an in-memory write extent and with read-accessed grains of hot extents migrated to an in-memory read extent, in accordance with embodiments of the present disclosure.

FIG. 2 illustrates a second instance 200 (e.g., at a time after the first instance 100) of the tiered storage system having write-accessed grains migrated from extent 3 108, extent 8 118, and extent 9 120 (e.g., the hot extents) of HDD tier 102 to an in-memory write extent 138. Likewise, read-accessed grains are migrated from extent 3 108, extent 8 118, and extent 9 120 (e.g., the hot extents) to an in-memory read extent 140.

Advantageously, and as shown in FIG. 2, the un-accessed grains in the extents 3 108, 8 118, and 9 120 are not migrated with the write-accessed grains and the read-accessed grains. By not migrating un-accessed grains, storage is conserved on the higher-performance SSD tier 124 and in the in-memory cache 136.

As will be noted, key 142 in FIG. 2 illustrates the additional grain status of migrated (dotted patterning). The migrated status is used to illustrate the transition of grains between tiers in the tiered storage system. However, the migrated status may mean several different things according to various embodiments. For example, grains with the migrated status may be unchanged (e.g., copied to in-memory write extent 138 and in-memory read extent 140 and not erased), deleted (e.g., copied to in-memory write extent 138 and in-memory read extent 140 and erased), overwritten (e.g., copied to in-memory write extent 138 and in-memory read extent 140 and then either (1) erased and new data written or (2) erased by overwriting the original data with new data), and so on.

Figure 3:
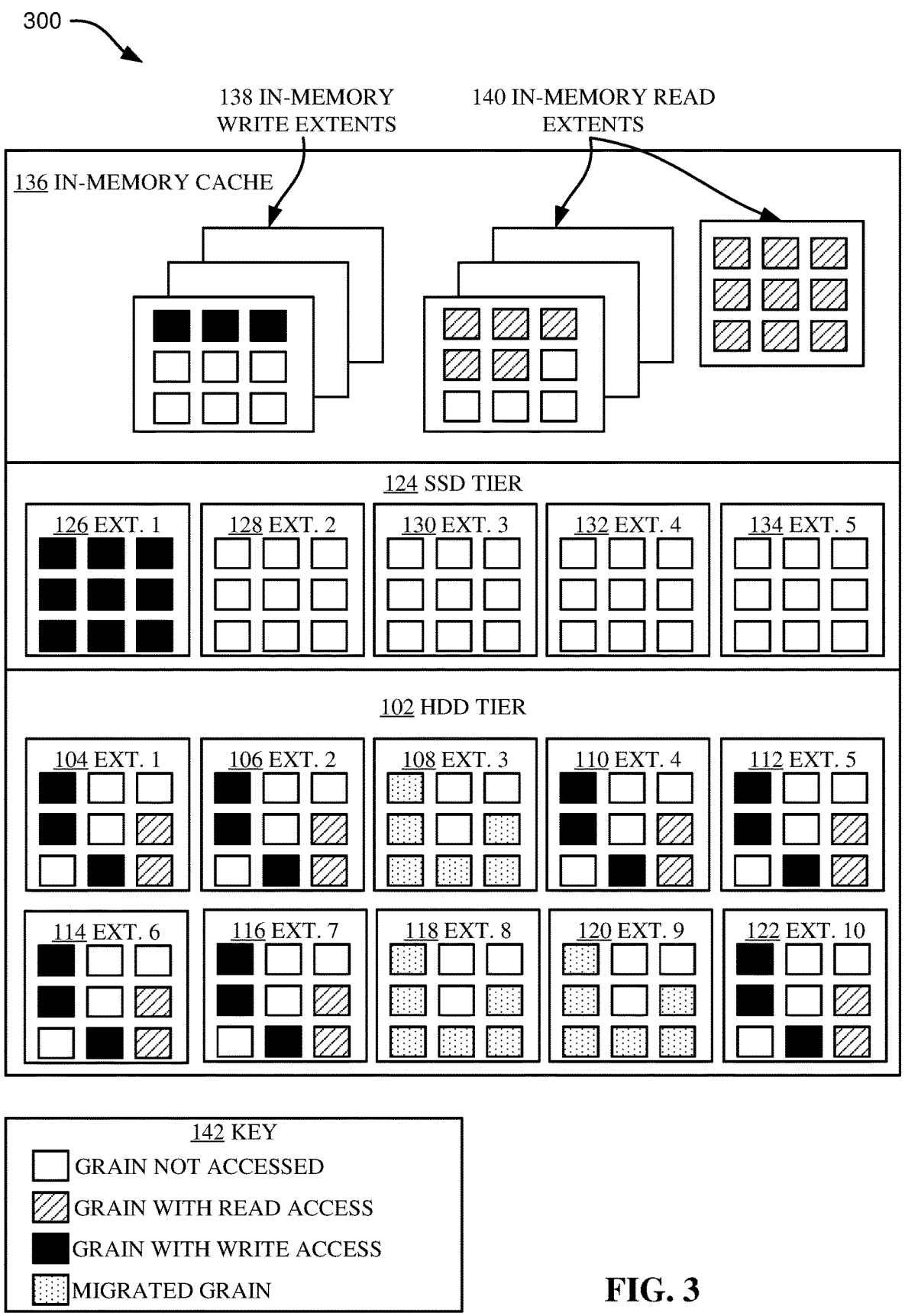
FIG. 3 illustrates a diagram of a tiered storage system with write-accessed grains in an in-memory write extent migrated to a solid-state drive, in accordance with embodiments of the present disclosure.

FIG. 3 illustrates a third instance 300 (e.g., at a time after the second instance 200) of the tiered storage system having write-accessed grains migrated from the in-memory write extent 138 to an extent 1 126 of the SSD tier 124. FIG. 3 also illustrates read-accessed grains from a filled in-memory read extent 140 being stored in the in-memory cache 136.

Holding read-write (e.g., write-accessed) grains in in-memory write extents 138 prior to writing them to extent 1 126 in SSD tier 124 improves SSD life by storing a full extent of write-accessed grains on extent 1 126 of SSD tier 124 in embodiments where in-memory write extent 138 is similarly sized to extent 1 126. Likewise, holding read-accessed grains from filled in-memory read extents 140 in the in-memory cache 136 rather than writing them to SSD tier 124 preserves storage resources of the SSD tier 124.

Nonetheless, while FIG. 3 illustrates the read-accessed grains of filled in-memory read extents 140 stored to in-memory cache 136, aspects of the present disclosure also allow for the read-accessed grains to be migrated from in-memory read extent 140 to an extent of the SSD tier 124 (e.g., in situations where the in-memory cache 136 is full).

FIG. 3 additionally illustrates additional write-accessed grains being stored in a new in-memory write extent 138 and additional read-accessed grains being store in a new in-memory read extent 140.

Figure 4:
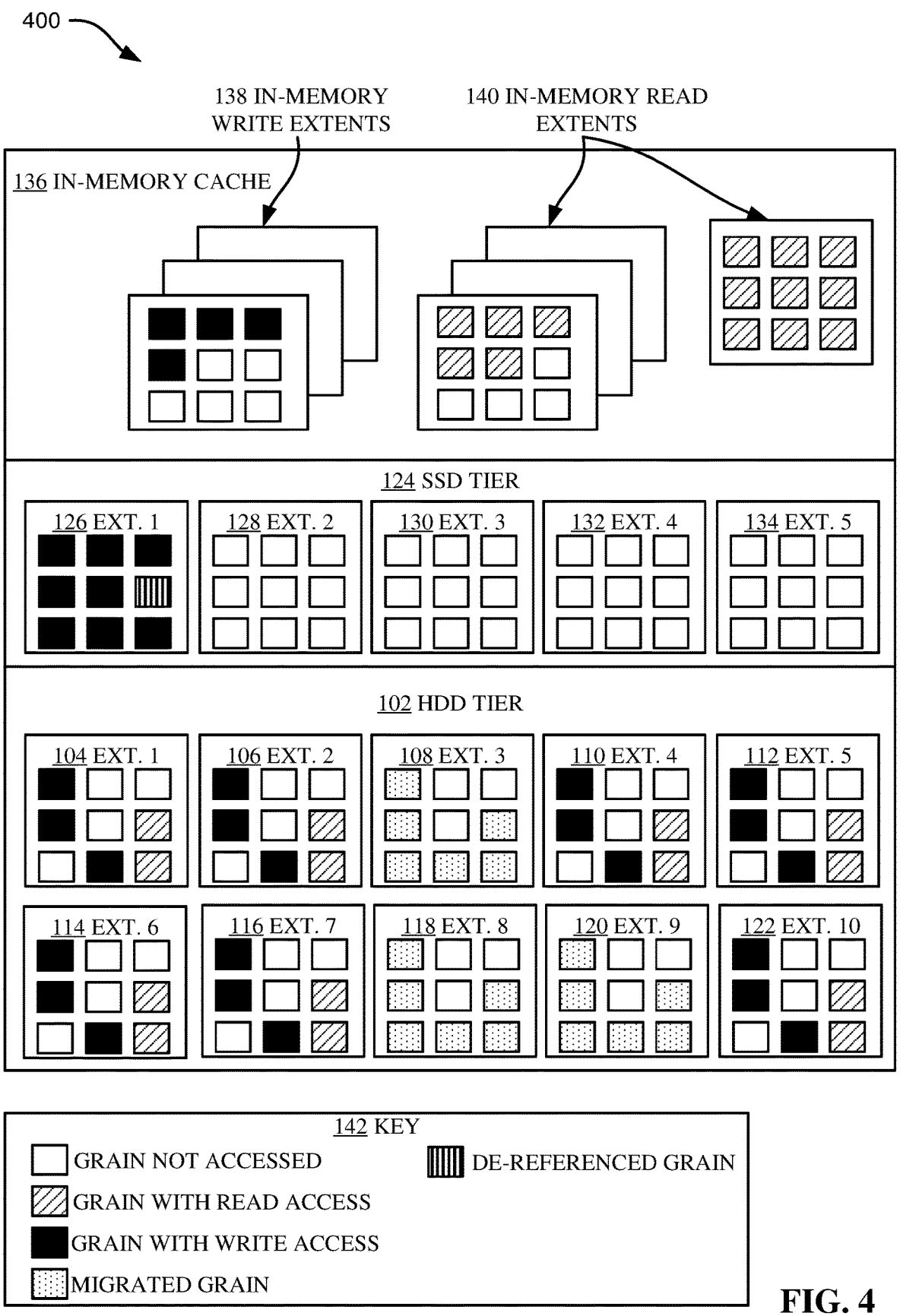
FIG. 4 illustrates a diagram of a tiered storage system with a modified write-accessed grain in a solid-state drive migrated to an in-memory write extent, in accordance with embodiments of the present disclosure.

FIG. 4 illustrates a fourth instance 400 (e.g., at a time after the third instance 300) of the tiered storage system having a modified write-accessed grain in extent 1 126 of SSD tier 124 stored in the in-memory write extent 138 of in-memory cache 136 and further having the original write-accessed grain de-referenced in extent 1 126 of SSD tier 124. De-referencing the original write-accessed grain is shown for illustrative purposes in FIG. 4 by vertical cross-hatching (e.g., see updated key 142 of FIG. 4). Writing the modified write-accessed grain to in-memory write extent 138 and de-referencing the original write-accessed grain in extent 1 126 of SSD tier 124 can reduce the write amplification on volumes of SSD tier 124.

As used herein, de-referencing can mean changing a pointer in a data map to point to the modified write-accessed grain newly stored in the in-memory write extent 138 rather than the original write-accessed grain in extent 1 126. Thus, the original write-accessed grain in extent 1 126 is not necessarily deleted, but rather can remain in extent 1 126, even though it is no longer pointed to as the current version of the related data.

In the event a read-accessed grain stored in in-memory cache 136 is modified, the modification can be stored directly in the in-memory cache 136.

Figure 5:
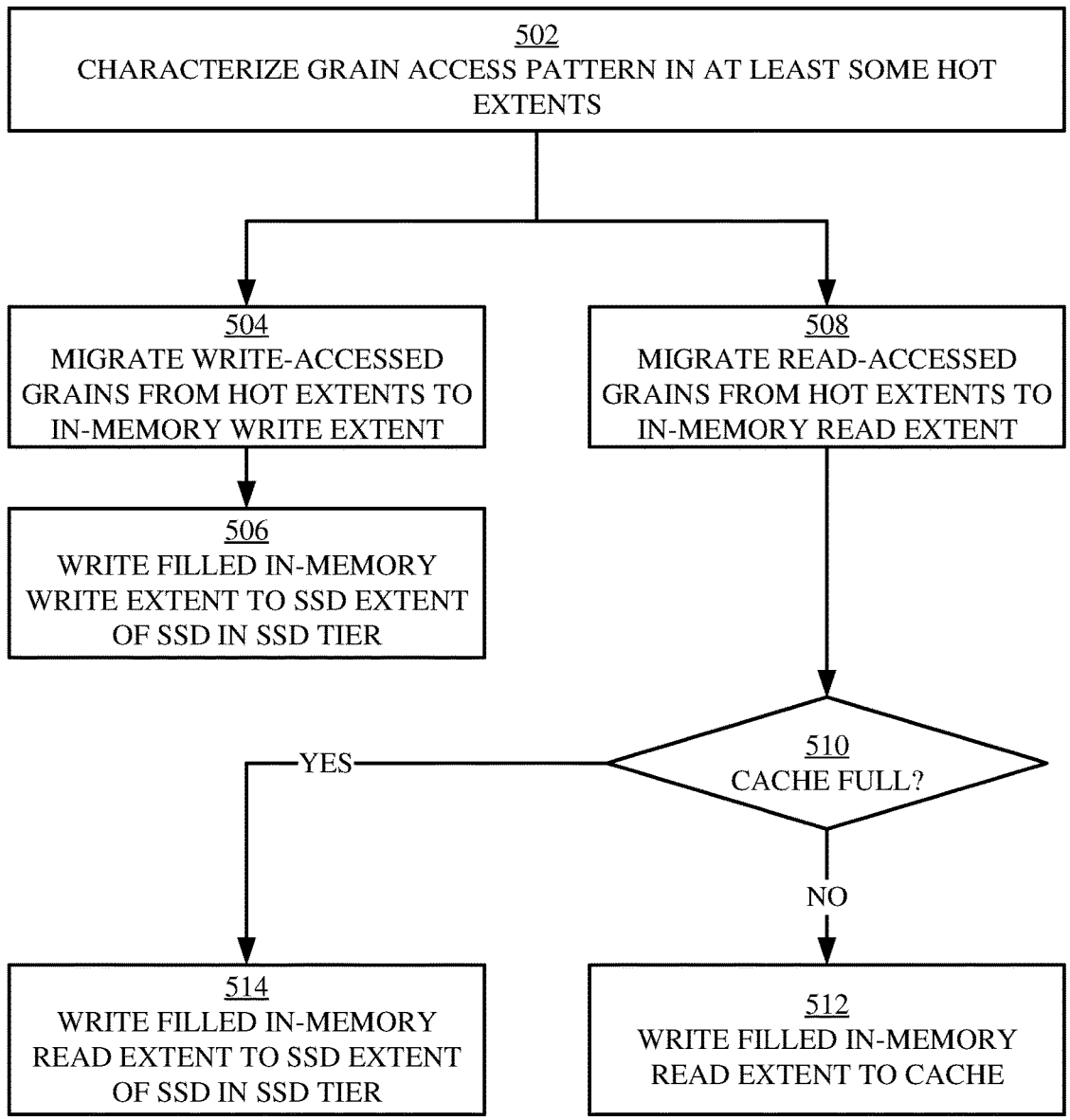
FIG. 5 illustrates a flowchart of an example method for migrating write-accessed grains and read-accessed grains from hot extents in a tier of a tiered storage system to an in-memory write extent and an in-memory read extent, in accordance with embodiments of the present disclosure.

Referring now to FIG. 5, illustrated is a flowchart of an example method 500 for migrating write-accessed grains and read-accessed grains from hot extents, in accordance with embodiments of the present disclosure. The method 500 can be performed by any combination of hardware and/or software configured to manage a tiered storage system (e.g., storage controller 900 of FIG. 9).

Operation 502 includes characterizing grain access patterns in a tiered storage system. In some embodiments, operation 502 includes classifying grains in at least hot extents in a lower tier (e.g., an HDD tier) as un-accessed (e.g., not accessed), read-accessed, or write-accessed. Extents can be classified as hot extents or cold extents based on types of I/O operations and/or numbers of I/O operations associated with various grains in respective extents.

Operation 504 includes migrating write-accessed grains from the hot extents of the lower tier to in-memory write extents. Operation 506 includes writing an in-memory write extent to an SSD extent of an SSD in the SSD tier of the tiered storage system. In some embodiments, operation 506 is triggered an the in-memory write extent is filled. In some embodiments, each in-memory write extent is similarly sized as the extents of the SSD tier.

Operation 508 includes migrating read-accessed grains in at least hot extents of the lower tier to an in-memory read extent stored in a working memory of the tiered storage system.

Operation 510 includes determining if the cache of the working memory of the tiered storage system is full. In the event that the cache is not full (510: NO), the method 500 proceeds to operation 512 and stores the in-memory read extent to the cache of the tiered storage system. In some embodiments, operation 512 is triggered when the in-memory read extent is determined to be full. In some embodiments, the in-memory read extent is similarly sized to extents in the cache of the working memory.

In the event that the cache is full (510: YES), the method 500 proceeds to operation 514 and writes the in-memory read extent to an SSD extent of an SSD volume in the SSD tier of the tiered storage system. In some embodiments, operation 514 is triggered when the in-memory read extent is determined to be full. In some embodiments, the in-memory read extent is similarly sized to extents in the SSD tier.

As shown in FIG. 5, operations 504-506 can occur in parallel with operations 508-514. In various embodiments, only operations 504-506 occur and operations 508-514 do not occur, or vice versa. In some embodiments, operations 504-506 occur sequentially (e.g., before or after) operations 508-514.

Figure 6:
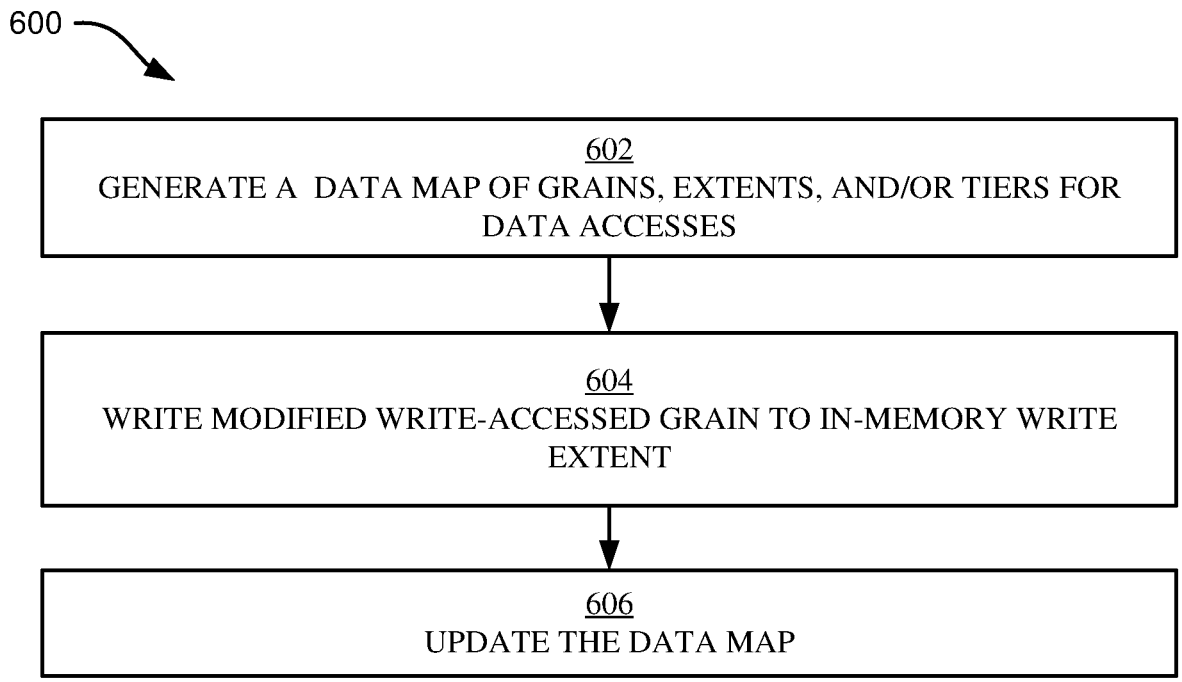
FIG. 6 illustrates a flowchart of an example method for generating a data map, in accordance with embodiments of the present disclosure.

Referring now to FIG. 6, illustrated is a flowchart of an example method 600 for generating a data map, in accordance with embodiments of the present disclosure. The method 600 can be performed by any combination of hardware and/or software configured to manage a tiered storage system (e.g., storage controller 900 of FIG. 9).

Operation 602 includes generating a data map of grains, extents, and/or tiers for respective data stored by the tiered storage system. The map can include classifications of grains (e.g., un-accessed, write-accessed, read-accessed, etc.), classifications of extents (e.g., hot, cold, etc.), locations of respective grains in a lower tier (e.g., an HDD tier), a higher tier (e.g., an SSD tier), an in-memory write extent, an in-memory read extent, and/or an in-memory cache, and so on.

Operation 604 includes writing a modified write-accessed grain to an in-memory write extent, where the unmodified write-accessed grain is stored in an extent of the SSD tier. Writing the modified write-accessed grain to the in-memory write extent (as opposed to updating it in the SSD tier) can reduce write amplification by avoiding writing updated data to the SSD tier.

Operation 606 includes updating the data map generated in operation 602 to reflect the new location of the modified write-accessed grain in the in-memory write extent and de-referencing the original write-accessed grain in the extent of the SSD tier. As previously discussed, de-referencing can mean changing a pointer in the data map to point to the modified write-accessed grain newly stored in the in-memory write extent rather than the unmodified write-accessed grain in the SSD tier. Thus, the unmodified write-accessed grain in the SSD tier is not necessarily deleted, but rather can remain in the SSD tier even though it is no longer pointed to as the current version of the related data in the data map.

Referring now to FIG. 7, illustrated is a flowchart of an example method 700 for demoting cold extents, in accordance with embodiments of the present disclosure. The method 700 can be performed by any combination of hardware and/or software configured to manage a tiered storage system (e.g., storage controller 900 of FIG. 9).

Operation 702 includes identifying a cold extent for demotion from an SSD tier to a lower tier (e.g., an HDD tier, a tape drive tier, etc.). An extent can be identified as a cold extent based on a number of I/O operations, a type of I/O operations, and/or a distribution of I/O operations on respective grains stored in the extent.

Operation 704 includes writing the cold extent to the lower tier. In some embodiments, the cold extent is written in its entirety to a single, similarly sized extent in the lower tier. In some embodiments, the cold extent is written to multiple extents in the lower tier. In embodiments where the cold extent is written to multiple extents in the lower tier, the multiple extents in the lower tier can be the original locations that the respective grains were originally stored before being aggregated and collectively migrated to the SSD tier via an in-memory write extent.

Operation 706 includes sending a TRIM command to the SSD layer to reclaim the invalid extent space resulting from returning the cold extent to the lower tier. Although a TRIM command is previously discussed, other commands are within the spirit and scope of the present disclosure such as, for example, a garbage collection command, an UNMAP command, and/or other commands.

Referring now to FIG. 8, illustrated is a flowchart of an example method 800 for configuring extent sizes, in accordance with embodiments of the present disclosure. The method 800 can be performed by any combination of hardware and/or software configured to manage a tiered storage system (e.g., storage controller 900 of FIG. 9).

Operation 802 includes identifying storage devices in a storage environment. Storage devices can include tape drives, HDDs, SSDs, working memories, and so on. Each of the storage devices can be configured with a predetermined or customizable extent size and/or grain size. SSDs can also contain a predetermined or customizable block erase size.

Operation 804 includes configuring the in-memory write extent size and in-memory read extent size to match a block erase size of an SSD in the SSD tier. In some embodiments, extent sizes and block erase sizes are configured to be approximately equal to one another. In some embodiments, extent sizes between different storage devices (e.g., HDDs vs. SSDs, different classes of SSDs, etc.) are configured to be approximately equal to one another. Although extent sizes are discussed above, some embodiments include configuring grain sizes.

Operation 806 includes applying the configured extent sizes to the in-memory write extent, the in-memory read extent, and/or the block erase size of the SSD(s) in the SSD tier.

Figure 9:
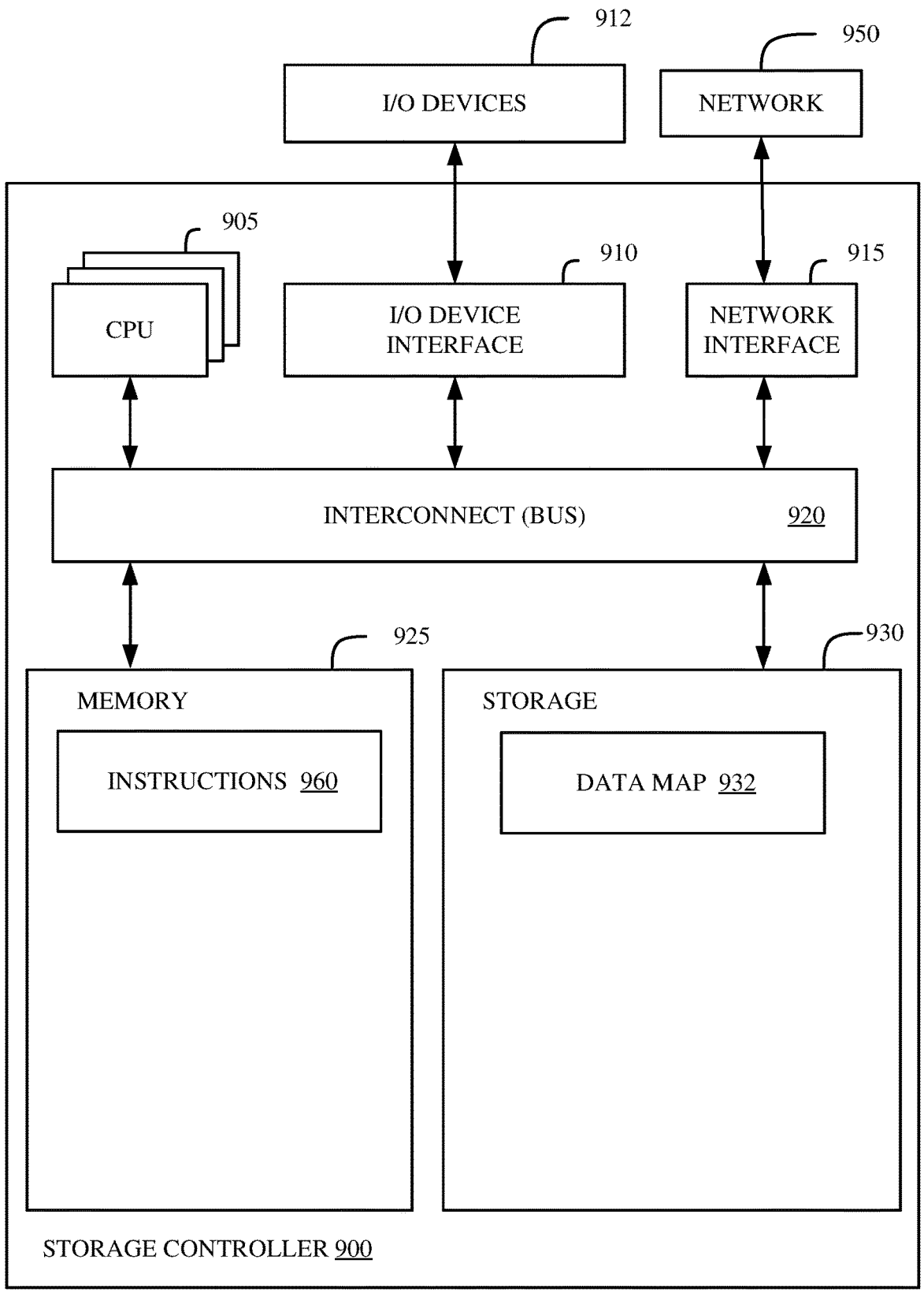
FIG. 9 illustrates a block diagram of an example storage controller, in accordance with embodiments of the present disclosure.

FIG. 9 illustrates a block diagram of an example storage controller 900 in accordance with some embodiments of the present disclosure. Storage controller 900 can be a combination of hardware and/or software configured to manage a physical or virtual storage system having multiple tiers.

In various embodiments, storage controller 900 can perform the methods described in FIGS. 5-8 and/or the functionality discussed in FIGS. 1-4. In some embodiments, the storage controller 900 receives instructions related to aforementioned methods and functionalities by downloading processor-executable instructions from a remote data processing system via a network 950. In other embodiments, storage controller 900 provides instructions for the aforementioned methods and/or functionalities to a client machine such that the client machine executes the method, or a portion of the method, based on the instructions provided by the storage controller 900.

The storage controller 900 includes a memory 925, storage 930, an interconnect 920 (e.g., BUS), one or more CPUs 905 (e.g., processors), an I/O device interface 910, I/O devices 912, and a network interface 915.

Each CPU 905 retrieves and executes programming instructions stored in the memory 925 or storage 930. The interconnect 920 is used to move data, such as programming instructions, between the CPUs 905, I/O device interface 910, storage 930, network interface 915, and memory 925. The interconnect 920 can be implemented using one or more busses. The CPUs 905 can be a single CPU, multiple CPUs, or a single CPU having multiple processing cores in various embodiments. In some embodiments, a CPU 905 can be a digital signal processor (DSP). In some embodiments, CPU 905 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 925 is generally included to be representative of a random access memory (e.g., static random access memory (SRAM), dynamic random access memory (DRAM), or Flash). The storage 930 is generally included to be representative of a non-volatile memory, such as a hard disk drive, solid state device (SSD), removable memory cards, optical storage, or flash memory devices. In an alternative embodiment, the storage 930 can be replaced by storage area-network (SAN) devices, the cloud, or other devices connected to the storage controller 900 via the I/O device interface 910 or a network 950 via the network interface 915.

In some embodiments, the memory 925 stores instructions 960 and storage 930 stores data map 932. However, in various embodiments, the instructions 960 and data map 932 are stored partially in memory 925 and partially in storage 930, or they are stored entirely in memory 925 or entirely in storage 930, or they are accessed over a network 950 via the network interface 915.

Instructions 960 can be processor-executable instructions for performing any portion of, or all of, any of the methods of FIGS. 5-8 and/or any of the functionality discussed in FIGS. 1-4. Data map 932 can be a map configured to store extent classifications, grain classifications, grain locations (historical, current, and/or projected), and so on. In some embodiments, data map 932 stores pointers to relevant grains of data and updates the pointers as grains are migrated between tiers.

In various embodiments, the I/O devices 912 include an interface capable of presenting information and receiving input. For example, I/O devices 912 can present information to a user interacting with storage controller 900 and receive input from the user.

Storage controller 900 is connected to the network 950 via the network interface 915. Network 950 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
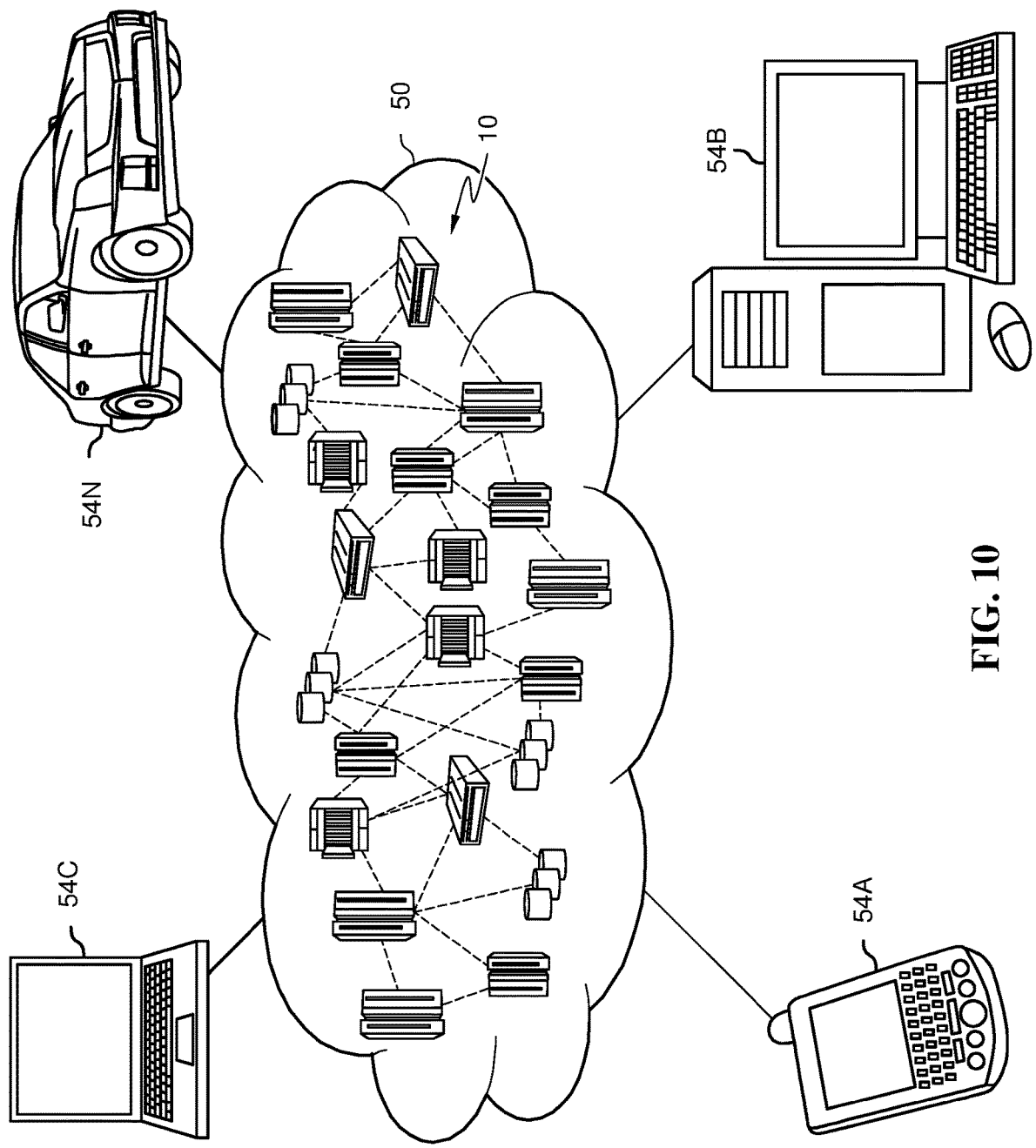
FIG. 10 depicts a cloud computing environment, according to some embodiments of the present disclosure.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
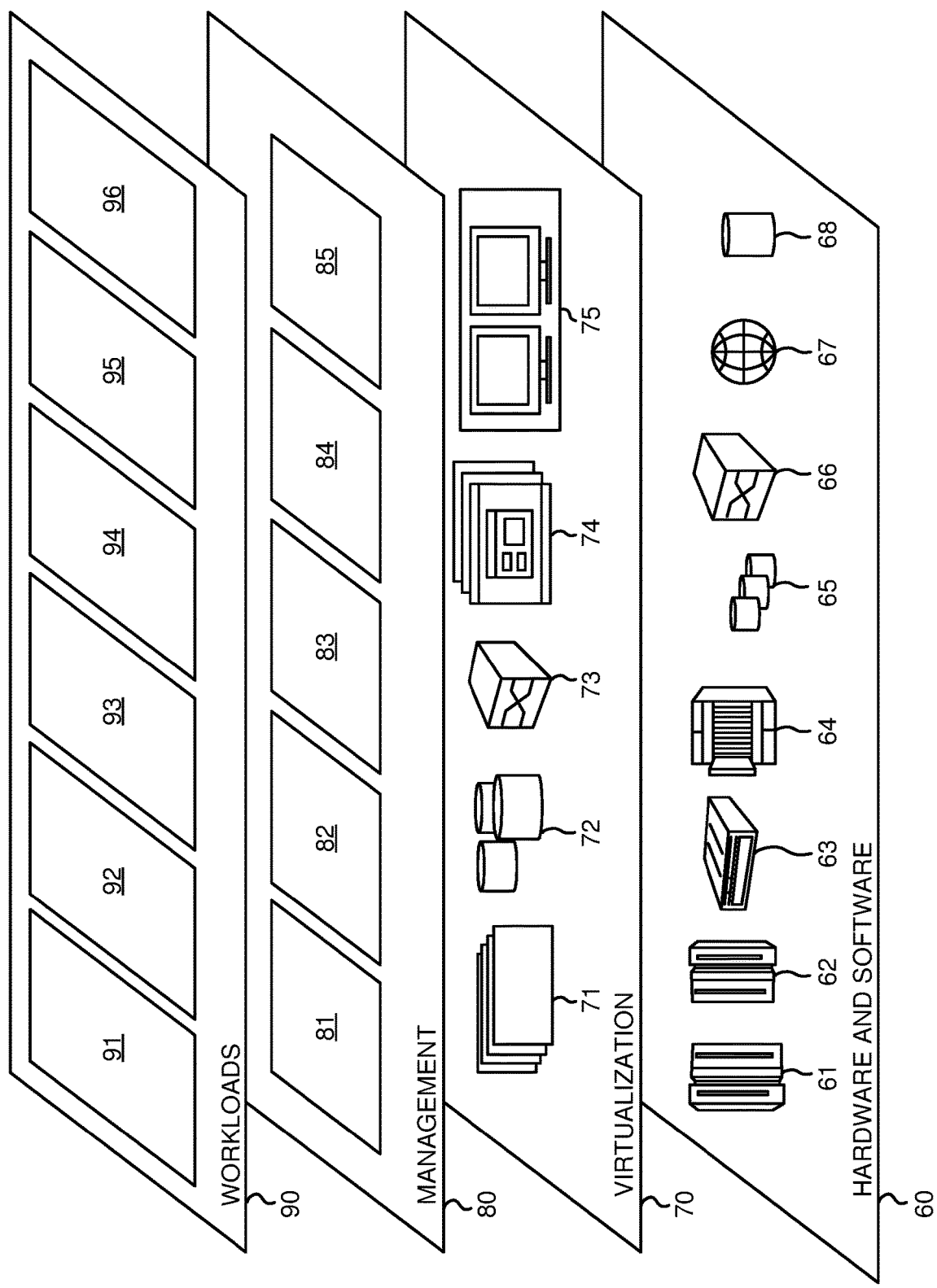
FIG. 11 depicts abstraction model layers, according to some embodiments of the present disclosure.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage system management 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9 and/or any software configured to perform any subset of the methods described with respect to FIGS. 5-8 and/or any of the functionality discussed in FIGS. 1-4) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

To further illustrate aspects of the present disclosure, several variations of the present disclosure will now be discussed.

A first variation relates to a method for migrating data in a tiered storage system comprising a hard disk drive tier and a solid-state drive tier, the method comprising characterizing grains in a first extent and a second extent in the hard disk drive tier by identifying a first grain in the first extent and a second grain in the second extent with write accesses and identifying a third grain in the first extent and a fourth grain in the second extent with read accesses, where the first extent and the second extent are hot extents. The method further comprises migrating the first grain and the second grain from the first extent and the second extent to an in-memory write extent stored in an in-memory cache of the tiered storage system. The method further comprises migrating the third grain and the fourth grain from the first extent and the second extent to an in-memory read extent stored in the in-memory cache of the tiered storage system.

A second variation including the limitations of the first variation further comprises migrating data from the in-memory write extent to an extent of a solid-state drive storage volume in the solid-state drive tier.

A third variation including the limitations of the second variation further includes the extent of the solid-state drive storage volume consisting of write-accessed grains migrated from a plurality of hot extents in the hard disk drive tier via the in-memory write extent.

A fourth variation including the limitations of the second and/or third variations further includes the first grain being updated to a modified first grain, and the method further comprising storing the modified first grain in the in-memory write extent, and updating a pointer in a data map associated with the first grain to point to the modified first grain in the in-memory write extent and deleting a previous pointer in the data map associated with the first grain and pointing to the extent of the solid-state drive storage volume.

A fifth variation including the limitations of one or more of the second through fourth variations further includes the in-memory write extent being a same size as the extent of the solid-state drive storage volume.

A sixth variation including the limitations of the fifth and/or sixth variations further includes migrating data from the in-memory write extent to an extent of a solid-state drive storage volume in the solid-state drive tier is triggered when the in-memory write extent is determined to be filled.

A seventh variation including the limitations of the fifth variation further includes the extent of the solid-state drive storage volume being a same size as a block erase size of the solid-state drive storage volume.

An eighth variation including the limitations of one or more of the first through the seventh variations further includes storing data from the in-memory read extent to an in-memory cache.

A ninth variation including the limitations of the eighth variation further includes the in-memory cache consisting of read-accessed grains from a plurality of hot extents migrated from the hard disk drive tier via the in-memory read extent.

A tenth variation including the limitations of one or more of the first through ninth variations further includes migrating, in response to filling the in-memory read extent and further in response to determining an in-memory cache is full, data from the in-memory read extent to an extent of a solid-state drive (SSD) storage volume in the solid-state drive tier.

An eleventh variation including the limitations of the first variation further includes migrating, in response to filling the in-memory write extent, data from the in-memory write extent to an extent of a solid-state drive storage volume in the solid-state drive tier of the storage system, and storing, in response to filling the in-memory read extent, data from the in-memory read extent to an in-memory cache.

A twelfth variation including the limitations of the eleventh variation further includes identifying a cold extent in the solid-state drive tier of the storage system for demotion to the hard disk drive tier of the storage system, migrating the cold extent to the hard disk drive tier, and sending a TRIM command to the solid-state drive tier related to the cold extent.

A thirteenth variation including the limitations of the twelfth variation further includes the cold extent including the first grain and the second grain, and where migrating the cold extent to the hard disk drive tier further comprises migrating the first grain to the first extent and migrating the second grain to the second extent.

A fourteenth variation including the limitations of one or more of eleventh through thirteenth variations further includes maintaining a data map of respective grains in the hard disk drive tier, the solid-state drive tier, the in-memory write extent, and/or the in-memory read extent.

A fifteenth variation including the limitations of one or more of the first through fourteenth variations further includes the method being performed by a storage controller executing program instructions, and where the instructions are downloaded to the storage controller from a remote data processing system via a network.

A sixteenth variation including the limitations of one or more of the first through fifteenth variations further includes the in-memory read extent and the in-memory write extent being dynamically sized to a same size as an erase block size of a solid-state drive of the tiered storage system.

A seventeenth variation relates to a tiered storage system including a first tier comprising a plurality of hot extents, where a respective hot extent comprises write-accessed grains, read-accessed grains, and un-accessed grains. The tiered storage system further including a cache, the cache comprising a write extent consisting of write-accessed grains from a plurality of hot extents in the first tier and a read extent consisting of read-accessed grains from the plurality of hot extents in the first tier. The tiered storage system further including a second tier comprising solid-state drives, a respective solid-state drive comprising an extent consisting of write-accessed grains from the write extent.

An eighteenth variation including the limitations of the sixteenth variation further includes the write extent being a same size as an extent of a solid-state drive in the second tier, and the write extent being a same size as a block erase size of the solid-state drive in the second tier.

A nineteenth variation generally relates to a storage volume functioning at least in part as cache for a tiered storage system, the storage volume comprising an in-memory write extent consisting of write-accessed grains retrieved from a plurality of hot extents in a first tier of the tiered storage system, where the in-memory write extent is a same size as a block erase size of a solid-state drive tier of the tiered storage system. The storage volume further comprising an in-memory read extent consisting of read-accessed grains retrieved from the plurality of hot extents in the first tier of the tiered storage system.

A twentieth variation including the limitations of the nineteenth variation further includes the in-memory write extent being configured to migrate data to the extent of the solid-state drive in response to filling the in-memory write extent.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for migrating data in a tiered storage system comprising a hard disk drive tier and a solid-state drive tier, the method comprising:

characterizing grains in a first extent and a second extent in the hard disk drive tier by identifying a first grain in the first extent and a second grain in the second extent with write accesses and identifying a third grain in the first extent and a fourth grain in the second extent with read accesses, wherein the first grain is updated to a modified first grain;

migrating the modified first grain and the second grain from the first extent and the second extent to an in-memory write extent stored in an in-memory cache of the tiered storage system;

migrating data from the in-memory write extent to an extent of a solid-state drive storage volume in the solid-state drive tier;

updating a pointer in a data map associated with the first grain to point to the modified first grain in the in-memory write extent by deleting a previous pointer in the data map associated with the first grain and pointing to the extent of the solid-state drive storage volume; and migrating the third grain and the fourth grain from the first extent and the second extent to an in-memory read extent stored in the in-memory cache of the tiered storage system.

2. The method according to claim 1, wherein the in-memory read extent and the in-memory write extent are dynamically sized to a same size as an erase block size of a solid-state drive of the tiered storage system.

3. The method according to claim 1, wherein the extent of the solid-state drive storage volume consists of write-accessed grains migrated from a plurality of hot extents in the hard disk drive tier via the in-memory write extent.

4. The method according to claim 1, wherein the in-memory write extent and the in-memory read extent are a same size as an erase block size of the solid-state drive storage volume.

5. The method according to claim 4, wherein migrating data from the in-memory write extent to the extent of the solid-state drive storage volume in the solid-state drive tier is triggered when the in-memory write extent is determined to be filled.

6. The method according to claim 1, wherein a filled in-memory read extent is stored in the in-memory cache.

7. The method according to claim 6, wherein the in-memory cache comprises read-accessed grains from a plurality of hot extents migrated from the hard disk drive tier via the in-memory read extent.

8. The method according to claim 1, further comprising:
migrating, in response to filling the in-memory read extent and further in response to determining that the in-memory cache is full, data from the in-memory read extent to an extent of a solid-state drive (SSD) storage volume in the solid-state drive tier.

9. The method according to claim 1, further comprising:
migrating, in response to filling the in-memory write extent, data from the in-memory write extent to an extent of a solid-state drive storage volume in the solid-state drive tier of the storage system; and
storing, in response to filling the in-memory read extent, data from the in-memory read extent to the in-memory cache.

10. The method according to claim 9, further comprising:
identifying a cold extent in the solid-state drive tier of the tiered storage system for demotion to the hard disk drive tier of the tiered storage system;
migrating the cold extent to the hard disk drive tier; and
sending a TRIM command to the solid-state drive tier related to the cold extent.

11. The method according to claim 10, wherein the cold extent includes the first grain and the second grain, and wherein migrating the cold extent to the hard disk drive tier further comprises migrating the first grain to the first extent and migrating the second grain to the second extent.

12. The method according to claim 9, further comprising:
generating a data map of respective grains in the hard disk drive, the solid-state drive tier, the in-memory write extent, and the in-memory read extent.

13. The method according to claim 1, wherein the method is performed by a storage controller executing program instructions, and wherein the instructions are downloaded to the storage controller from a remote data processing system via a network.

14. A tiered storage system comprising:
a first tier comprising a plurality of hot extents, wherein a respective hot extent comprises write-accessed grains, read-accessed grains, and un-accessed grains;
a cache comprising:
a write extent consisting of write-accessed grains from a plurality of hot extents in the first tier; and
a read extent consisting of read-accessed grains from the plurality of hot extents in the first tier; and
a second tier comprising solid-state drives, a respective solid-state drive comprising an extent consisting of write-accessed grains from the write extent, wherein the write extent is the same size as a block erase size of the solid-state drives in the second tier.

15. A system comprising:
a solid-state drive functioning at least in part as cache for a tiered storage system, the solid-state drive comprising:
an in-memory write extent consisting of write-accessed grains retrieved from a plurality of hot extents in a first tier of the tiered storage system, wherein the in-memory write extent is a same size as a block erase size of a solid-state drive tier of the tiered storage system; and
an in-memory read extent consisting of read-accessed grains retrieved from the plurality of hot extents in the first tier of the tiered storage system.

16. The system according to claim 15, wherein the in-memory write extent is configured to migrate data to an extent of the solid-state drive tier in response to filling the in-memory write extent.

* * * * *